United States Patent [19]
Katsen

[11] Patent Number: 5,158,849
[45] Date of Patent: Oct. 27, 1992

[54] COMPOSITION USEFUL IN TRANSPARENT CONDUCTIVE COATINGS

[75] Inventor: Boris J. Katsen, Longmeadow, Mass.

[73] Assignee: Custom Papers Group Inc., Jay, Me.

[21] Appl. No.: 603,016

[22] Filed: Oct. 25, 1990

[51] Int. Cl.$^5$ .............................................. G03G 15/04
[52] U.S. Cl. ......................................... 430/63; 430/58
[58] Field of Search ............................... 430/63, 58, 56

[56] References Cited

U.S. PATENT DOCUMENTS 4,647,521  3/1987  Oguchi et al. ......................... 430/58
4,985,324  1/1991  Kitatani et al. ....................... 430/58

Primary Examiner—Marion E. McCamish
Assistant Examiner—S. Rosasco
Attorney, Agent, or Firm—Burns, Doane, Swecker & Mathis

[57] ABSTRACT

Provided is a conductive coating composition which comprises a colloidal dispersion of cuprous iodide particles in a binder resin solution which contains an ohmic bridging electrolyte. The preferred ohmic bridging electrolyte is potassium iodide. The colloidal dispersion also preferably exists in an aqueous system, with the binder resin being a water soluble polymer such as a polyvinyl alcohol. Upon coating a support with the dispersion, a transparent conductive coating is achieved comprised of ohmic bridged cuprous iodide particles and the binder resin. Such a coating composition can be advantageously used in the manufacture of imaging elements, and provides many advantages in the handling and manufacture of the imaging elements, as well as in the adhesive properties exhibited by the imaging elements.

4 Claims, No Drawings

COMPOSITION USEFUL IN TRANSPARENT CONDUCTIVE COATINGS

BACKGROUND OF THE INVENTION

The production of unitary conductive elements which are particularly useful in such areas as electrophotography and electrostatic films and papers in general, have been extensively described in patents and other literature. Many of these conductive elements have multilayer structures and are prepared by coating a substrate layer with a conductive material. A further coating may then be added, as for example, in an electrophotographic element, wherein a layer of photoconductive composition is coated over the conductive material. If desired, a barrier layer may be imposed between the conducting material and the photoconductive compositional layer.

One of the many problems encountered in the process of producing conductive elements, and particularly those useful in electrophotography and electrography, is that there is a difficulty in obtaining good adhesion between the various layers. Moreover, the uniform dispersions of the conducting material used in producing the conductive elements usually include a polymeric binder. Solvents for the polymeric binder and the conductivity material are often difficult to obtain since conducting materials are often insoluble in the polymer solvent and vice versa.

The foregoing disadvantages for producing conductive elements, and in particular electrophotographic elements, are even more problematic when the conductive layer is a cuprous iodide (CuI) coating. For instance, in U.S. Pat. No. 3,245,833, a volatile organic solvent is used to solubilize the binding material and to dissolve the solubilized semiconductor compound. But in order to solubilize the semiconductor compound a complexing agent must also be added. This complexing agent is usually a chelating agent, and in some cases it can be the solvent. After the coating of the solution of CuI, the solvent is then evaporated and CuI particles are formed in-situ in the coating after drying.

U.S. Pat. Nos. 3,597,272 and 3,740,217 suggest another method of achieving, specifically, an electrophotographic element while overcoming the problems of layer adhesion and mutual solvents. An imbibition procedure is disclosed. The conductive layer is formed by imbibing a binder-free solution of volatile solvent and a metal-containing semiconductor into an electrically insulating polymeric subcoating carried on a support, and then evaporating the solvent. Many of the examples illustrate the use of a solution of cuprous iodide in acetonitrile as the volatile solvent.

The use of acetonitrile as a solvent for the coating process of CuI is well known. However, when using acetonitrile, the uniformity of the conductive coating is difficult to control. East German Patent Nos. DD223,550, DD220,155, DD201,527, DD157,369, DD157,368, and DD149,721 illustrate the preparation of conductive layers containing CuI from organic solutions, including acetonitrile solutions, or the preparation of opaque conductive stripes for the purposes of annotation using a dispersion of CuI in a binder. The use of acetonitrile solutions can also be hazardous. For example, acetonitrile is known to produce HCN under thermal degradation at high temperatures.

While environmental impact and safety concerns are items that must be considered whenever organic solvents are used in coating processes, the prior art processes are fraught with hazards due to the use or generation of toxic materials during the processes. Numerous patents exist which describe processes utilizing a solution approach to the deposition of CuI from highly toxic solvents, such as, for example, acetonitrile. See, for example, U.S. Pat. No. 3,505,131. Fuji Japanese patent publication 58/136044 discloses a binderless coating process which utilizes acrylonitrile solvents. Thereby, highly toxic solvents are again resorted to in the manufacture of films, the resistivity of which is believed too low, in any event, for electrostatic imaging materials.

V. Sumita et al disclose in the *Journal of Appl. Polymer Science*, Vol. 23, pp. 2279-91 (1979), a process for making conductive films by treating Cu complexes of divalent copper and polyvinyl alcohol with vapors of iodide carried in acetone. The entire procedure requires special measures to contain the highly toxic iodine vapors and extremely flammable acetone vapors. There are also side reactions which render the system nonconductive and make the process unstable.

It would therefore be advantageous to be able to utilize a material useful in transparent, conductive coatings which exhibits good adhesion properties, and which also permits its manufacture and handling without exposure to toxic chemicals.

It is therefore an object of the present invention to provide a transparent conductive coating dispersion material which is devoid of a toxic solvent and which is suitable for use in manufacturing electrostatic and electrophotographic films.

Another object of the present invention is to provide such a material which when coated onto a substrate forms a conductive layer which exhibits good adhesion to the substrate.

It is another object of the present invention to provide such a material that forms a conductive layer which also exhibits good adhesion properties with respect to any dielectric or photoconductive layers.

Yet another object of the present invention is to provide a process for preparing a ground plane suitable for use in electrostatic and electrophotographic films, as well as antistatic materials, which avoids the use of toxic materials and avoids any residual harmful or toxic solvents in the conductive layer.

It is another object of the present invention to provide such a ground plane which is humidity independent.

Still another object of the present invention is to provide such a ground plane having a conductive layer which exhibits excellent transparency in the visible spectrum and the UV spectrum suitable for diazo reprographic processes.

These and other objects of the present invention will become apparent upon a review of the following specification and the claims appended thereto.

SUMMARY OF THE INVENTION

In accordance with the foregoing objectives, there is provided by the present invention a conductive colloidal dispersion of cuprous iodide particles in a binder resin solution which contains an ohmic bridging electrolyte. Such a coating composition is, in general, useful as a novel coating in the preparation of a ground plane for electrophotographic and electrostatic imaging elements, as well as antistatic materials. In a preferred embodiment, the ohmic bridging electrolyte is potassium iodide or sodium thiosulfate. Upon coating a support with the dispersion a conductive coating is achieved comprised of ohmic bridged cuprous iodide particles and a binder resin. The ohmic bridges between the cuprous iodide particles are established by the ohmic bridging electrolyte.

It is most preferred that the colloidal dispersion exists in an aqueous system, with the binder resin being a water soluble polymer such as polyvinyl alcohol. In a most preferred embodiment, a silanol modified polyvinyl alcohol is added to the binder resin solution as a dispersing and milling aid.

A process for the production of such a coating material and the manufacture of imaging elements utilizing the novel coating material are also provided herewith.

DETAILED DESCRIPTION OF THE PREFERRED EMBODIMENTS OF THE INVENTION

The novel transparent conductive coating composition of the present invention comprises a dispersion of cuprous iodide particles and an ohmic bridging electrolyte in a resin binder solution. The dispersion is preferably of colloidal cuprous iodide particles. It is understood in the art that a colloidal dispersion is a suspension of finely divided particles in a continuous medium. The particles themselves are called the disperse phase, or the colloid, and the medium is the dispersing medium. The colloidal dispersion differs from an ordinary solution or dispersion in that the size of the particle lies in the range between 1 and 0.001 micron. While it is preferred that the dispersion of the present invention contain only particles of submicron size, it is intended for the purposes of the present invention to cover those instances where the dispersion does contain a relatively small amount of particles having a size greater than 1 micron, and which particles normally would not be considered "colloidal" in nature.

In the present invention it is preferred that the average particle size of the cuprous iodide particles is about 300 nanometers or less, and more preferably is about 200 nanometers or less. The most preferred average particle size of the cuprous iodide particles is in the range of from about 90–170 nanometers. Such a particle size results in a visual background density of about 0.1 and an absorption density below 0.2 in the UV spectrum. The dispersion is also most preferably an aqueous system, with the binder resin being a water soluble polymer such as polyvinyl alcohol.

It has been found that the presence of the ohmic bridging electrolyte in the coating composition of the present invention provides many advantages. For example, when the concentration of the binder is high in a conductive coating composition, the conductive particles could be separated from one another due to the formation of a polymeric film on the particles by the resin binder. This formation of a film could render the coating insufficiently conductive for its intended purpose, or at least less conductive than expected or desired. This phenomenon could happen at the minimal binder concentration required and/or desired for adhesion and grinding purposes. It has been surprisingly found that the presence of small amounts of an ohmic bridging electrolyte in the coating composition avoids this problem and provides for uninterrupted conductivity in the resulting conductive layer. As a result, regulation of the required conductivity for electrographic, electrostatic and antistatic materials is much easier. Upon coating the composition onto a support, it is believed the ohmic bridging electrolyte permits the conductivity between the cuprous iodide particles to be uninterrupted by forming ohmic bridges between the cuprous iodide particles.

In addition to the advantages of improved and more predictable and reproducible conductivity, the presence of an iodide electrolyte, and in particular potassium iodide, also advantageously results in the removal of free iodine from the coating dispersion. This removal is believed to be achieved in two different ways. First, the electrolyte itself is believed to complex with the free iodine. Second, the electrolyte is believed to act as a catalyst for the free iodine to complex with the polyvinyl alcohol. The removal of the free iodine results in a coating of improved transparency and color, as any yellow background color is eliminated.

It is also believed that iodide electrolytes, and in particular potassium iodide, prevent contamination of the cuprous iodide particles from contaminants introduced into the dispersion through contact with any equipment used in the preparation or coating of the dispersion.

The electrolyte can be any appropriate electrolyte for forming ohmic bridges between the cuprous iodide particles, and are preferably alkali metal iodides, thiosulfates, bisulfites and dithionates. In particular, the iodides, thiosulfates, dithionates and bisulfites of sodium and potassium are preferred, with the iodides, and in particular potassium iodide, being most preferred.

The amount of ohmic bridging electrolyte employed in the practice of the present invention can vary based upon the amount of cuprous iodide employed in the dispersion. In general only a small amount of the electrolyte is needed. Based upon the weight of the conductive coating composition, the amount of electrolyte employed is generally in the range of from about 0.5 weight percent to about 3 weight percent based on a dry coating, and most preferably in the range of from about 1.0 weight percent to about 2 weight percent based on a dry coating. In the dispersion, the amount of electrolyte added will generally range from about 0.05 wt % to 0.3 wt %.

The amount of cuprous iodide employed in the dispersion will generally depend upon the desired application of the ultimate article to be manufactured, which dictates the surface resistivity needed for the conductive coating layer. In general, such transparent conductive coatings preferably have a surface resistivity of from about $10^4$ to $10^9$ ohms per square, with the surface resistivity being modified by changing the pigment (cuprous iodide) to binder ratio. When an electrostatic material is to be manufactured, the surface resistivity is preferably in the range of from about 0.5 to $5 \times 10^6$ ohms per square. When an electrophotographic material is to be manufactured, the surface resistivity of the conductive layer is preferably below $10^6$ ohms per square. The cuprous iodide to binder ratio employed in the coating composition is accordingly adjusted.

The term "surface resistivity" generally refers to the measurement of electrical leakage across an insulating surface. However, in the present specification, the term is used with reference to the resistance or conductivity of films that behave as conductors transmitting currents through the body of the coating of electrically conducting and semiconducting materials. Moreover, in the case of thin conductive coatings, measurement of the conductive property in terms of surface resistivity provides a value that is useful in measurement and practice.

A suitable binder resin for use in the present invention may be selected from any of the water soluble binders. The most preferred binder is that of polyvinyl alcohol. The polyvinyl alcohol can be fully or partially hydrolyzed polyvinyl alcohol, or a modified polyvinyl alcohol. Such polyvinyl alcohol binder can be used alone, or in various combinations. Other suitable water soluble binders include without limitation, methylcellulose, hydroxyethylcellulose, hydroxypropylcellulose, soluble grades of gelatin, carboxylmethylcellulose, soluble grades of styrene-maleic anhydride copolymers, water soluble acrylic polymers and polyvinylpyrrolidone.

Generally, from about 0.1 to 10 weight percent binder is utilized in the final dispersion of the coating composition of the present invention, with from about 0.2 to about 2 weight percent being most preferred. Once the dispersion is coated onto a suitable support and dried, the binder content in the coating layer will generally range from about 1 to 20 wt %, with from about 3 to 1? wt % being most preferred. The more conductive one desires the coating, the less binder that is used. The desired conductivity, of course, will depend upon the ultimate application.

The binder is generally dissolved in an aqueous solvent system. It is the use of this aqueous system which avoids the problems of handling and working with toxic organic solvents as in the prior art.

In a most preferred embodiment, silanol modified polyvinyl alcohol is added to the coating dispersion. The amount of silanol modified polyvinyl alcohol added to the dispersion is generally in the range of from about .0025% by weight to about 2% by weight, and most preferably in the range of from about 0.15% by weight to about 0.5% by weight. The inclusion of the silanol modified polyvinyl alcohol has been found to be very advantageous for several reasons. First, its presence results in decreased foaming during the processing of the CuI dispersion, and hence less defects are observed in any subsequent coatings due to the absence of air bubbles. The silanol modified polyvinyl alcohol also acts as a grinding aid, reducing the necessary time involved in obtaining a better distribution of particles. The wetting properties of polyester supports are also not a problem when silanol modified polyvinyl alcohol is present, and greater water resistivity is exhibited by the resulting conductive coating. The presence of silanol modified polyvinyl alcohol also stabilizes the CuI dispersions to help preclude excessive settling before a colloidal state is achieved during grinding, and to help preclude any agglomeration of the CuI particles once a colloidal dispersion is achieved. For the foregoing reasons, it is most preferred to include silanol modified polyvinyl alcohol in the coating composition.

The colloidal dispersion is prepared by adding the above-identified ingredients, i.e., the cuprous iodide, ohmic bridging electrolyte and aqueous binder resin solution, and milling these ingredients over a period of time, under ambient conditions. Any type of milling is generally appropriate, e.g., ball milling, sand milling or media milling. Media milling using horizontal media mills such as those manufactured by Netzsch are efficient and dispersions prepared using the horizontal media mill have been found to produce excellent coatings. The transparency of the films that are formed by this method can also be affected by the duration of milling.

In a most preferred embodiment, the colloidal dispersion is achieved by a combination of grinding and separation steps as described in copending, commonly owned application U.S. Ser. No. 603,002 filed concurrently herewith. In the process, it is most preferred that a two-step grinding process is utilized, with the initial grinding being conducted in a media mill and the final comminution of the particles being achieved in an impingement mill. A bi-modal distribution of particles is accordingly achieved, with the mode of smaller particles being separated, preferably by centrifugation of filtration.

By using such a grinding/separation method in preparing the colloidal dispersion, a colloidal dispersion having an average particle size of 300 nm or less, more preferably 200 nm or less, and most preferably CuI particles having an average particle size in the range of from about 90 to 170 nm, can be most efficiently and effectively achieved. The colloidal dispersion is also quite stable and the sizes of the particles are within a narrow range. The use of such colloidal dispersions also results in extremely transparent conductive coatings, with light transmission in the visible spectrum being as high as 80%, or even 90%. Transparency has also been observed in the diazo reprographic range of the UV spectrum.

After the colloidal dispersion has been milled and/or subjected to a separation step, an electrostatic film, for example, can then be made by layering the colloidal dispersion onto a support layer of choice, e.g., by a Mayer rod. Any support or substrate layer may be utilized to produce a ground plane for a conductive element such as an electrophotographic imaging element. These supports generally consist of polymer films such as polyethylene terephthalate films (PET), polyethylene films, polypropylene films, bond-coated polyester films, as well as any other support utilized in the art. Other supports, however, such as paper supports, can also be appropriately used. The support materials may be properly selected according to the use and purpose of the electrostatic imaging element.

Furthermore, the present invention is not limited to any particular means for applying the colloidal dispersion onto the substrate or support layer and any suitable means may be used such as coating by a Mayer rod, roll coating, gravure, offset gravure, whirl coating, dip coating, spray coating, etc. The means for applying the colloidal dispersion is only limited by the fact that a colloid may be difficult to apply with various forms of instrumentation.

The preferred coating weight of the conductive colloidal dispersion coating on the support, e.g., polyester support, is generally in the range of from about 0.1 to 0.5 g/m$^2$, and most preferably from about 0.25 to about 0.35 g/m$^2$.

A further coating, e.g., of an electrostatic layer, may then be coated on top of the conductive layer. For example, a polymeric support can be coated with a cuprous iodide colloidal dispersion layer in accordance with the present invention, and then an electrostatic layer can be added to complete the formation of an electrostatic film.

If an electrophotographic material is desired, a barrier layer may be further coated over the conductive layer with any known coating that is available in the art, such as a polymer of polyvinyl alcohol or polyamide. A photosensitive layer can then be added to complete the formation of an electrophotographic film.

The coating composition of the present invention results in transparent, conductive coatings which exhibit excellent adhesion to the support, e.g., a polyester substrate, on which it is coated, as well as superb cohesive forces. Thus, it is difficult, if not impossible, to lift any of the coating from a support such as a polyester substrate even after cutting the coating in a criss-cross pattern with a sharp knife. The adhesion of a dielectric coating to a conductive ground plane prepared by coating a support with the composition of the present invention is also excellent. No lift is observed when adhesive tape (Scotch® tape) is applied and then pulled off, nor when the dielectric coated material is submerged in boiling water for up to 5-10 minutes at least.

Thus, the present invention offers many advantages. Among the advantages are that the colloidal dispersion is extremely stable and does not change significantly in terms of the average particle size, binder state or in overall physical chemical properties, thereby rendering the colloidal dispersion extremely workable and advantageous in its use. Furthermore, one can avoid exposure to volatile and toxic solvents during the manufacture of the colloidal dispersion composition of the present invention and during the manufacture of a conductive ground plane upon coating the colloidal dispersion on a suitable support. Using conventional techniques, a truly thin film of about 0.15 microns can be easily obtained. The conductive layer also contains no residual volatile or toxic solvents, and does not contain any surface active components, e.g., phosphates or succinates. The composition of the present invention is also quite flexible in that clear and transparent films could be made to satisfy the requirements for electrostatic, electrophotographic and antistatic materials by simply altering the ratio of the cuprous iodide to binder resin ratio in the composition, and by appropriately adjusting the addition of the ohmic bridging electrolyte.

The invention will now be more fully explained by the following examples. However, the scope of the invention is not intended to be limited to these examples.

COMPARATIVE EXAMPLE 1

A colloidal dispersion was prepared by using a two-step grinding process.

845 g of technical grade CuI were dispersed in 1000 grams of 2% solution of fully hydrolyzed polyvinyl alcohol (Airvol 107 from Air Products). The resulting dispersion was treated in a laboratory Eiger Mill for 2 hours, until the average particle size of the dispersion was reduced to about 1.2 microns. This dispersion was then subjected to 10 passes through an impingement mill (Microfluidizer Model M110Y from Microfluidics Inc.) until a bimodal distribution was achieved at an average particle size of 505 nanometers. The mode consisting of the smaller particles was separated by centrifugation. The final dispersion had an average particle size of 148 microns and had a yellow bluish tint.

The resulting dispersion was coated with a Mayer rod #2 onto a polyester support and dried, which gave a conductive coating having a surface resistivity of about $5 \times 10^8$ ohms per square. When the dry coating was examined, a small amount of surface defects was found, due to a collapse of air bubbles dispersed in the wet coating. The resulting coating was transparent in all ranges of the visible spectrum. Its light transmittance in the reprographic area of the ultraviolet spectrum was about 17%.

EXAMPLE 1

This example demonstrates the excellent coating effects achieved when silanol modified polyvinyl alcohol is used in the coating composition. A colloidal dispersion was prepared as in Comparative Example 1, but the 1000 grams of polyvinyl alcohol solution was prepared as follows:

980 grams of water was heated to 160° F. at which temperature 19 grams of Airvol 107 and 1 g of silanol modified polyvinyl alcohol (Kuraray Poval R-2105) were added. The mixture of the two polymers and water was heated up to 195° F. until complete solubilization of the polyvinyl alcohol occurred.

After the solution was cooled, 845 grams of CuI was added, and the resulting dispersion was ground in the Eiger mill, and then comminuted in the impingement mill until a bi-modal distribution of the dispersion was achieved. The mode with the smaller particles was separated by centrifugation to give a colloidal dispersion of CuI particles, with an average particle size of about 130 nanometers. No foam was observed in the dispersion and when this dispersion was coated on the polyester support with Mayer rod #2, a thin conductive coating of no more than 0.2 microns (by SEM analysis) was obtained.

A discrete conductive layer having no observable defects was formed, which layer also exhibited excellent adhesion to the polyester support and was not removable by Scotch® tape, even after making several cuts in the coating with a sharp knife. While no surface defects were observed, the coating was yellowish in color.

EXAMPLE 2

Half of the binder used in Example 1 was used in formulating the coating dispersion of the present Example. Thus, 990 g of water, 9.5 g of Airvol 107 and 0.5 grams of Kuraray R-2105 were used to prepare a resin binder solution. 845 grams of CuI were added to the binder solution and was subjected to a two-step grinding process as in Comparative Example 1 and Example 1. A useful bi-modal distribution was obtained after seven passes through the impingement mill. The mode with the smaller average particle size (average particle size of 160 nanometers) was separated and the resulting dispersion was coated on a polyester support to give a conductive coating, which exhibited excellent adhesion despite using only half the amount of binder as in Comparative Example 1 and Example 1. When a coating was applied to a polyester support using Mayer Rod #2, a surface resistivity of $5.7 \times 10^7$ ohms per square was observed.

EXAMPLE 3

A dispersion was prepared as in Example 2. Potassium iodide was added to the dispersion, in accordance with the present invention, in the amount of 10 grams. This resulted in the following composition for the dispersion:

CuI - 845 grams
polyvinyl alcohol (Airvol 107) - 9.5 grams
silanol modified polyvinyl alcohol - 0.5 grams
KI - 10 grams This dispersion was then subjected to a two-step grinding process as in Example 2 until a bi-modal distribution was achieved.

A colloidal dispersion with an average particle size of 120 nm was separated from the bi-modal dispersion to give a coating dispersion, which was a violet color.

When the resulting dispersion was deposited on a polyester support with Mayer rod #2, a thin conductive coating (of about 0.15–0.2 microns by SEM) was obtained, which had all of the desirable characteristics for electrostatic materials, i.e., it had a light transmittance in the UV region above 52% and as high as 90% in the visible part of light spectra, the adhesion of the coating layer to the polyester support was excellent, as well as its surface resistivity, which was measured at from 1 to 6 megahoms per square, which is a desirable conductivity range for high density electrostatic printing. When a Mayer rod #3 was used in coating a support with the dispersion, an increase in conductivity was sufficient to give a conductive CuI layer with a surface resistivity of $10^5$ ohms per square immediately after coating and drying. The surface resistivity was $10^4$ per square after the material was maintained at ambient conditions for 5 minutes or longer. A conductive coating layer of this conductivity is desirable for the preparation of electrophotographic materials.

EXAMPLE 4

16 kg of the dispersion of Example 2 were prepared at an average particle size of 164 nanometers, and was applied to a polyester support on a pilot coater using a reverse roll station. Some difficulties were observed in wetting the polyester support and the applicator roll. The colloidal coating dispersion was accordingly adjusted by adding 180 grams of 2% solution of silanol modified PVA and by the addition of 26 grams of potassium iodide. The conductivity of the resulting liquid dispersion was measured and found to be 7 Siemens. The wetting properties of this dispersion were found to be excellent and a conductive coating was obtained after drying the coating well in a dryer at 205° F. for 45 seconds.

The conductive ground plane was more than 52% transparent in the UV region and more than 80% transparent in the visible spectrum, and no defects were observed. The conductive coating demonstrated excellent adhesion and showed a surface resistivity of 0.5 to 3.0 megahoms per square, which is a highly desirable range for electrostatic printing.

EXAMPLE 5

The final dispersion of Example 4 was circulated in a coating station for eight hours and several rolls of conductive material were made. After 3-4 hours of circulation, the surface resistivity of the dry CuI coating started to increase to $10^7$ ohms per square. A small amount of fresh KI was added and the surface resistivity was restored to the previous value of $10^6$ ohms per square.

The conductivity of the dispersion after addition of KI was measured and found to be 9-10 Siemens. The coating process continued and the surface resistivity of the conductive ground plane was maintained in a range of 1 to 3 megahoms per square. The resulting high quality ground plane conductive coating was analyzed by TGA method and consisted of:

CuI - 92%
polyvinyl alcohol - 4.2%
Silanol modified polyvinyl alcohol - 2.3%
KI - 1.5% The total amount of solids in the colloidal dispersion used to produce the above-described ground plane was about 7.9-8% by weight. The composition of the colloidal dispersion, which was used to produce the high quality conductive ground plane was as follows:
water - 92%
polyvinyl alcohol - 0.34%
silanol modified PVA - 0.18%
CuI - 7.4%
KI - 0.12%

EXAMPLE 6

A conductive ground plane was prepared according to the conditions of Example 5, and was overcoated with a dielectric coating, which was based on a polystyrene resin with silica particles dispersed in a solution of this resin in the organic solvent. The resulting dielectric material was subjected to relative humidity of 25, 50 and 75% at 50° C. for 5 days. After this treatment, the material was equilibrated for two hours at ambient temperature and was printed on various Versatec electrostatic printers to give clear, defect free images with a reflectance density of about 1.25-1.30 optical density units independent of RH value, demonstrating that this particular coating composition is independent of relative humidity, despite the fact that the conductive layer of the ground plane is comprised of semiconductive CuI dispersed in a water soluble binder.

While the invention has been described in detail and with reference to specific embodiments thereof, it will be apparent to one skilled in the art that various changes and modifications can be made without departing from the spirit and scope thereof.

What is claimed is:

1. An electrostatic imaging element comprised of an electrostatic layer and a ground plane, said ground plane being comprised of a support and a conductive coating layer thereon, wherein the conductive coating layer is comprised of ohmic bridged cuprous iodide particles and a binder resin, with an ohmic bridging electrolyte comprised of a sodium or potassium iodide, thiosulfate, bisulfate, bisulfite or dithionate being present in the conductive coating layer to thereby provide ohmic bridging between the cuprous iodide particles.

2. The electrostatic imaging element of claim 1, wherein an ohmic bridging electrolyte comprised of potassium iodide is present in the conductive coating layer.

3. An electrophotographic imaging element comprised of a photosensitive layer and a ground plane, said ground plane being comprised of a support and a conductive coating layer thereon, wherein the conductive coating layer is comprised of ohmic bridged cuprous iodide particles and a binder resin, with an ohmic bridging electrolyte comprised of a sodium or potassium iodide, thiosulfate, bisulfate, bisulfite or dithionate being present in the conductive coating layer to thereby provide ohmic bridging between the cuprous iodide particles.

4. The electrophotographic imaging element of claim 3, wherein an ohmic bridging electrolyte comprised of potassium iodide is present in the conductive coating layer.

* * * * *

UNITED STATES PATENT AND TRADEMARK OFFICE
CERTIFICATE OF CORRECTION

PATENT NO. : 5,158,849

DATED : Oct. 27, 1992

INVENTOR(S) : Boris J. Katsen

It is certified that error appears in the above-identified patent and that said Letters Patent is hereby corrected as shown below:

On the title page after "Assignee:", delete "Custom Papers Group Inc., Jay, Me." and insert therefor -- Graphics Technology International Inc., So. Hadley, Ma. -- .

Signed and Sealed this

Sixteenth Day of February, 1993

Attest:

STEPHEN G. KUNIN

*Attesting Officer*  *Acting Commissioner of Patents and Trademarks*